(12) United States Patent
Wu

(10) Patent No.: US 11,580,322 B2
(45) Date of Patent: Feb. 14, 2023

(54) SCALABLE ATTRIBUTED GRAPH EMBEDDING FOR LARGE-SCALE GRAPH ANALYTICS

(71) Applicant: INTERNATIONAL BUSINESS MACHINES CORPORATION, Armonk, NY (US)

(72) Inventor: Lingfei Wu, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 383 days.

(21) Appl. No.: 16/875,928

(22) Filed: May 15, 2020

(65) Prior Publication Data
US 2021/0357681 A1 Nov. 18, 2021

(51) Int. Cl.
G06T 7/162 (2017.01)
G06K 9/62 (2022.01)
G06N 20/00 (2019.01)
G06N 5/04 (2006.01)
G06N 5/046 (2023.01)

(52) U.S. Cl.
CPC ......... *G06K 9/6224* (2013.01); *G06K 9/6269* (2013.01); *G06N 5/046* (2013.01); *G06N 20/00* (2019.01)

(58) Field of Classification Search
CPC ...... G01C 21/20; G01C 21/32; G06B 29/106; G06F 16/9535; G06T 7/11; G06T 7/187; G06K 9/6231; G06V 10/84
See application file for complete search history.

(56) References Cited

U.S. PATENT DOCUMENTS

| | | | | |
|---|---|---|---|---|
| 7,215,828 B2 * | 5/2007 | Luo | ......... | G06V 20/10 382/296 |
| 7,266,447 B2 * | 9/2007 | Bauer | ..... | G01C 21/20 701/461 |
| 7,307,820 B2 * | 12/2007 | Henson | ......... | H02H 1/0015 324/536 |
| 7,421,341 B1 * | 9/2008 | Hopkins | ......... | G01C 21/26 701/428 |
| 7,487,041 B2 * | 2/2009 | Devries | ............. | G01C 21/3626 701/25 |
| 7,953,513 B2 * | 5/2011 | Bhat | ........ | B29C 49/78 700/197 |

(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Yosef Kassa
(74) *Attorney, Agent, or Firm* — Intelletek Law Group, PLLC; Gabriel Daniel, Esq.

(57) ABSTRACT

A computer-implemented method for calculating Scalable Attributed Graph Embedding for Large-Scale Graph Analytics that includes computing a node embedding for a first node-attributed graph in a node embedded space. One or more random attributed graphs is generated in the node embedded space. A graph embedding operation is performed using a dissimilarity measure between one or more raw graphs and the one or more generated random graphs, and an edge-attributed graph into a second node-attributed graph using an adjoint graph.

17 Claims, 9 Drawing Sheets

(56) References Cited

U.S. PATENT DOCUMENTS

| | | | |
|---|---|---|---|
| 8,205,134 B2* | 6/2012 | Harrison | H03M 13/1111 |
| | | | 714/752 |
| 8,228,818 B2* | 7/2012 | Chase | H04L 41/06 |
| | | | 370/232 |
| 8,380,721 B2* | 2/2013 | Attaran Rezaei | G06F 16/334 |
| | | | 707/723 |

OTHER PUBLICATIONS

Wu, L. et al., "Scalable Global Alignment Graph Kernel Using Random Features: From Node Embedding to Graph Embedding"; KDD (2019); 11 pgs.

Zhang, Y. et al., "Learning Node Embeddings in Interaction Graphs"; CIKM (2017); 10 pgs.

Zhou, C. et al., "Scalable Graph Embedding for Asymmetric Proximity"; Proceedings of the Thirty-First AAAI Conference on Artificial Intelligence (AAAI-2017); 7 pgs.

* cited by examiner

| Dataset | PROTEINS | MUTAG | BZR_MD | Cuneiform |
|---|---|---|---|---|
| SAGE | 77.2± 0.3 (4.6s) | 91.1± 0.7 (0.2s) | 70.7± 0.7 (6.6s) | 45.8 ± 1.1 (13.3s) |
| WL | 71.2± 0.8 | 84.4± 1.5 | -- | -- |
| DGCNN | 75.5± 0.9 | 85.8± 1.7 | -- | -- |
| RetGK | 75.8± 0.6 (166.6s) | 90.3± 1.1(3.5s) | 63.4± 1.5(15.6s) | 38.4± 1.9 (25.4s) |

FIG. 5

SCALABLE ATTRIBUTED GRAPH EMBEDDING FOR LARGE-SCALE GRAPH ANALYTICS

BACKGROUND

Technical Field

The present disclosure generally relates to graph analytics. More particularly, the present disclosure relates to a system and method for graph analytics utilizing graph embedding.

Description of the Related Art

Graph Analytics are used in various applications to represent entities and their relationships. Conventional graph analytics involves utilizing graph kernels that only consider discrete node labels, ignoring the rich information in node and edge attributes. A first challenge of large scale analytics is to consider both node and edge attributes. Another challenge is to provide good scalability for both graph size and graph samples. Most graph kernels learn sparse feature representations that is not expressive when compared with embedding-based methods. In addition, the conventional approaches to graph analytics are computationally expensive, requiring relatively large amounts of processing power and storage space. There is a need to perform graph analytics that employ nodes and edges to represent the attributes of the entities being graphed without significant amounts of processing power and memory.

SUMMARY

According to one embodiment, there is a computer-implemented method for performing graph analytics by learning attributed graph embeddings from node attributes and edge attributes of a graph. The method includes computing a node embedding for a first node-attributed graph in a node embedded space, and generating one or more random attributed graphs in the node embedded space. Graph embedding is computed using a dissimilarity measure between one or more raw graphs and the generated random graphs, and an edge-attributed graph is converted into a second node-attributed graph using an adjoint graph. This method provides for more accurate graphing at an increased speed with a reduction in processor power and storage.

In an embodiment, the method includes computing graph embedding for the second node-attributed graph obtained by the converting of the edge attributed graph, and fusing the computed node embedding from the second node-attributed graph and the first node-attributed graph into a graph representation.

In an embodiment, graph representation is applied to a machine learning (ML) or an artificial intelligence (AI) task-dependent analysis.

In an embodiment, the computing node embedding is performed by one of an eigendecomposition, a deepwalk, a node2vc, or a LINE operation.

In an embodiment, the generating random attributed graphs in the embedded space includes sampling a plurality of sub-graphs from the first node-attributed graph.

In an embodiment, the computing of graph embedding for the second node-attributed graph by using a dissimilarity measure includes computing a graph feature matrix based on the special distance function by using random node-attributed graphs.

In an embodiment, the converting an edge-attributed graph into the second node-attributed graph using an adjoint graph further includes casting edge-attributed graphs as embedding node attributed graphs.

In an embodiment, the computing graph embedding for the second node-attributed graph includes passing the new node attributed graph.

According to one embodiment, a system for performing graph analytics includes a processor configured to perform graph representation by learning attributed graph embeddings of node attributes and edge attributes of a graph. A memory is coupled to the processor, the memory storing instructions to cause the processor to perform acts including computing a node embedding for a first node-attributed graph in a node embedded space. There is a generating of one or more random attributed graphs in the node embedded space, and graph embeddings are computed using a dissimilarity measure between one or more raw graphs and the generated random graphs. An edge-attributed graph is converted into a second node-attributed graph using an adjoint graph. This system provides increased processing speed with more accurate graph analytics than conventional system. In an embodiment, the processor is further configured to compute graph embeddings for the second node-attributed graph obtained by the converting of the edge attributed graph. An operation is performed to fuse the computed node embedding from the second node-attributed graph and the first node-attributed graph into a graph representation.

In one embodiment, a non-transitory computer readable storage medium tangibly embodying a computer readable program code having computer readable instructions that, when executed, causes a computer device to perform a method of graph analytics by learning attributed graph embeddings from node attributes and edge attributes of a graph, the method includes computing a node embedding for a first node-attributed graph in a node embedded space. One or more random attributed graphs are generated in the node embedded space. Graph embeddings are computed by using a dissimilarity measure between one or more raw graphs and the generated random graphs. An edge-attributed graph is converted into a second node-attributed graph using an adjoint graph. The computer readable storage medium causes more efficient graph analysis with reduced power consumption storage.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 5 is table showing test results comparing the use of different methods on large datasets by various methods with the present method, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

According to the present disclosure, a computer-implemented method and system for performing graph analytics by learning attributed graph embeddings from node attributes and edge attributes of a graph provides enhances accuracy in performing graphical analytics.

Figure 1A:
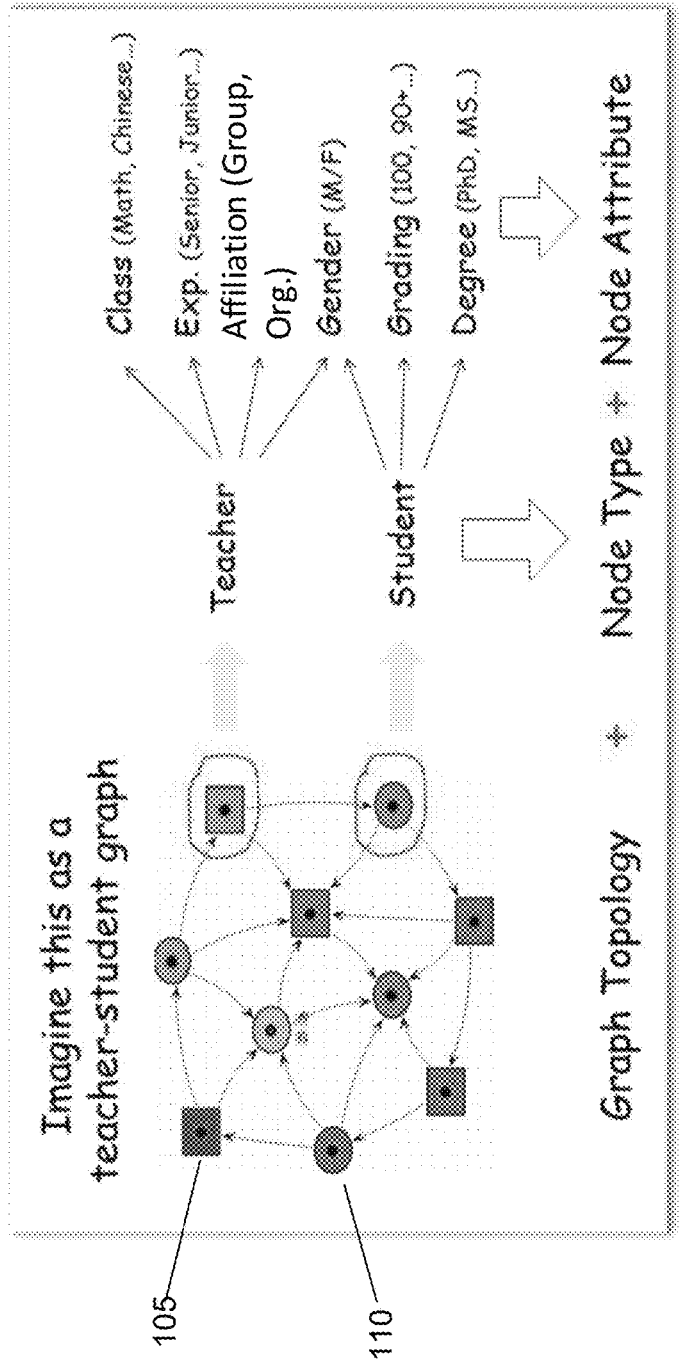
FIGS. 1A and 1B are illustrations of attributed graphs, consistent with an illustrative embodiment.

In an illustration 100A of attributed graphs, FIG. 1A is a teacher-student graph provided for illustrative purposes. The graph topology includes a node type of a teacher 105 and student 110. The node attributes 115 represent information about the teacher 105 and the student 110. The node attributes 115 for the teacher 105 can include, for example, the type of class taught (e.g., Math, language), teacher's position (associate professor, professor), experience level (junior, senior). The node attributes for the student 110 can include degree (PhD, M.S.), grade (90, 100), etc. These node attributes provide rich information that can be used for various graph analytics.

Figure 1B:
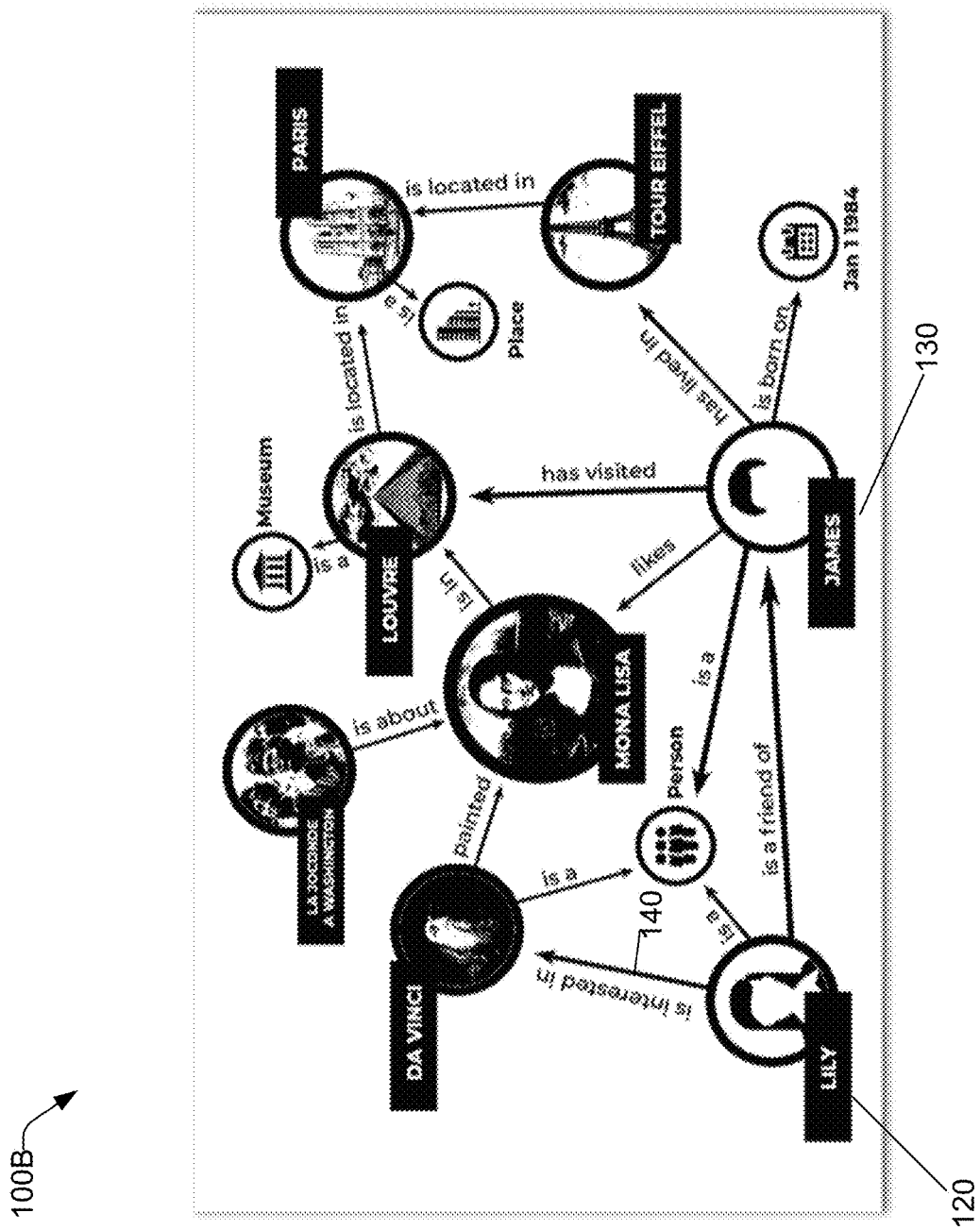

FIG. 1B is another illustration 100B of attributed graphs, consistent with an illustrative embodiment. In FIG. 1B, two people Lilly 120, James 130, are two node attributes. The edge attributes 140 are some of the inter-relationships between Lilly 120 and James 130. For example, Lilly 120 is interested DaVinci, who painted the Mona Lisa, and James 130 likes the Mona Lisa. Thus, edge attributes provide additional rich information beyond the information of the node attributes. By performing graphical analysis of both node attributes and edge attributes, a more detailed and accurate analysis can be made than, for example, comparing only node labels.

The computer-implemented method and system for performing graph analytics by learning attributed graph embeddings from node attributes and edge attributes of a graph according to the present disclosure provides a unifying graph embedding framework via a randomized kernel approximation that is capable of considering both node attributes and edge attributes. In addition, the computer-implemented system and method provides an improvement in fields such as Artificial Intelligence, particularly with regard to machine learning, and a wide variety of applications including but not limited to disease classification based on rain activities, road congestion prediction based on traffic flows, online anomaly detection in online social networks, spatial-temporal analysis in biological samples, and graph pattern matching and searching.

The computer-implemented system method provides for an improvement in the efficiency of computer operations, as the rich information in mode attributes and edge attributes is considered in addition to or in place of discrete node labels. For example, there is an improvement over existing kernel approaches that provides a significant reduction in memory consumption, which can be a reduction of:

$$O(Nn+N^2) \text{ to } O(NR), R \ll N,$$

where N is the number of graphs, n is the size of each graph, and O is the upper bound of the algorithm.

In addition, there is a significant reduction in computational complexity of computing a kernel or similarity matrix from $O(N^2 n^2)$ to $O(NRn\log(n))$, $R \ll N$, and a resultant savings in power.

Example Architecture

Figure 2:
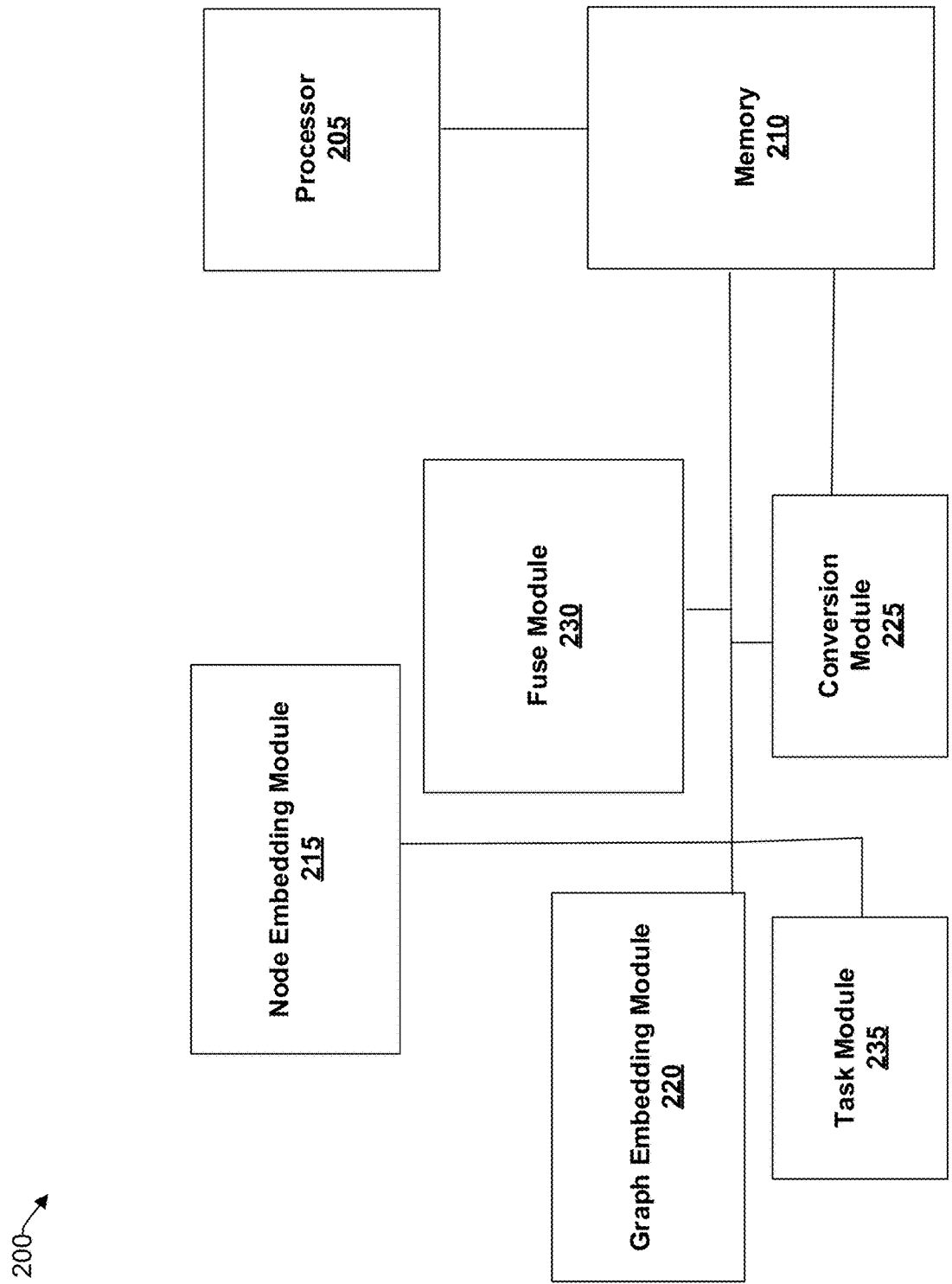
FIG. 2 shows a block diagram of a system for performing graph analytics, consistent with an illustrative embodiment.

FIG. 2 shows a block diagram 200 of a system for performing graph analytics, consistent with an illustrative embodiment. A processor 205 is configured to execute instructions stored in a memory 210. While the logical representations are shown for ease of understanding, it is to be understood that there is no requirement to a number and type of modules. The node embedding module 215 includes instructions to configure the processor 205 to perform node embedding of the graphs to be analyzed. The graph embedding module 220 can cause the processor 205 to perform graph embedding, for example, by using a dissimilarity measure between raw graphs and generated random graphs. The conversion module 225 causes the processor 205 to convert an edge-attributed graph into a second node-attributed graph, for example, by using an adjoint graph (as used herein, the term adjoint refers to the transpose of a matrix in which each element is replaced by its cofactor).

The fuse module 230 causes the processor to fuse the computed node embedding from the first node-attributed graph and second node-attributed graph. The task module may cause the processor to perform a task utilizing the fused graph. It is to be understood that additional functionality may be present, such as a classification function that may be performed by the processor 205.

Figure 3:
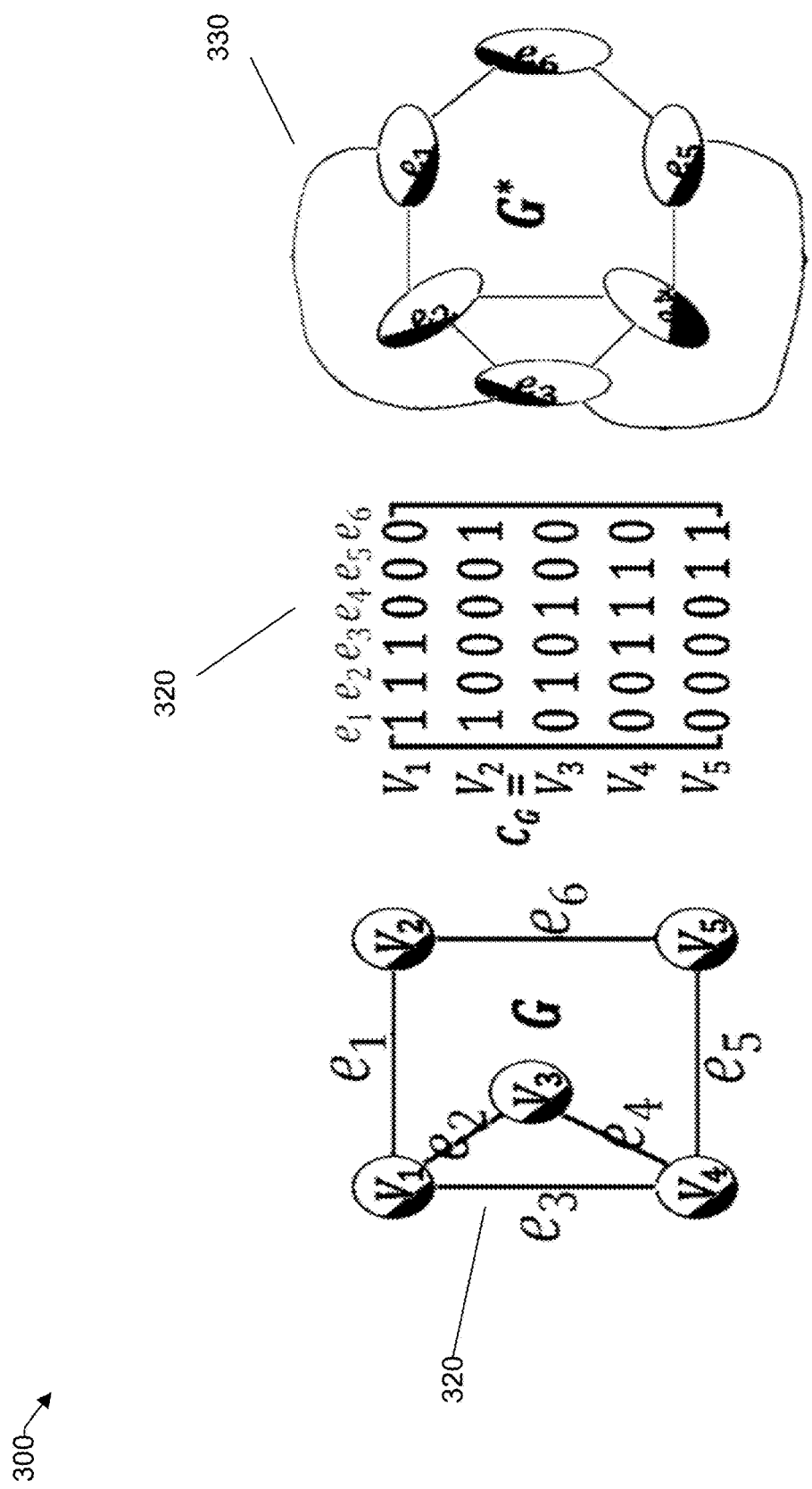
FIG. 3 is an illustration of a conversion of node attribute and edge attribute graph to a line graph, consistent with an illustrative embodiment.

FIG. 3 is an illustration of conversion of a node attribute and edge attribute graph to a line graph consistent with an illustrative embodiment. FIG. 3 shows a graph 310, a corresponding incidence matrix 320, and an adjoint graph 330. The edge-attributed graph 310 is converted into the adjoint graph 330. It can be seen from graph 310 that the edges $e_1$, $e_2$ and $e_3$ share a common node $V_1$. After the conversion, in graph 330, $e_1$, $e_2$ and $e_3$ are connected. In an embodiment, the conversion occurs by the modified (or normalized) incidence matrix, $\tilde{C}$, e.g., according to:

$\tilde{C} = D^{-1/2} C$, wherein D is a degree matrix which is used for computing the joint embeddings of the nodes and edges of graph 310.

Example Processes

Figure 4:
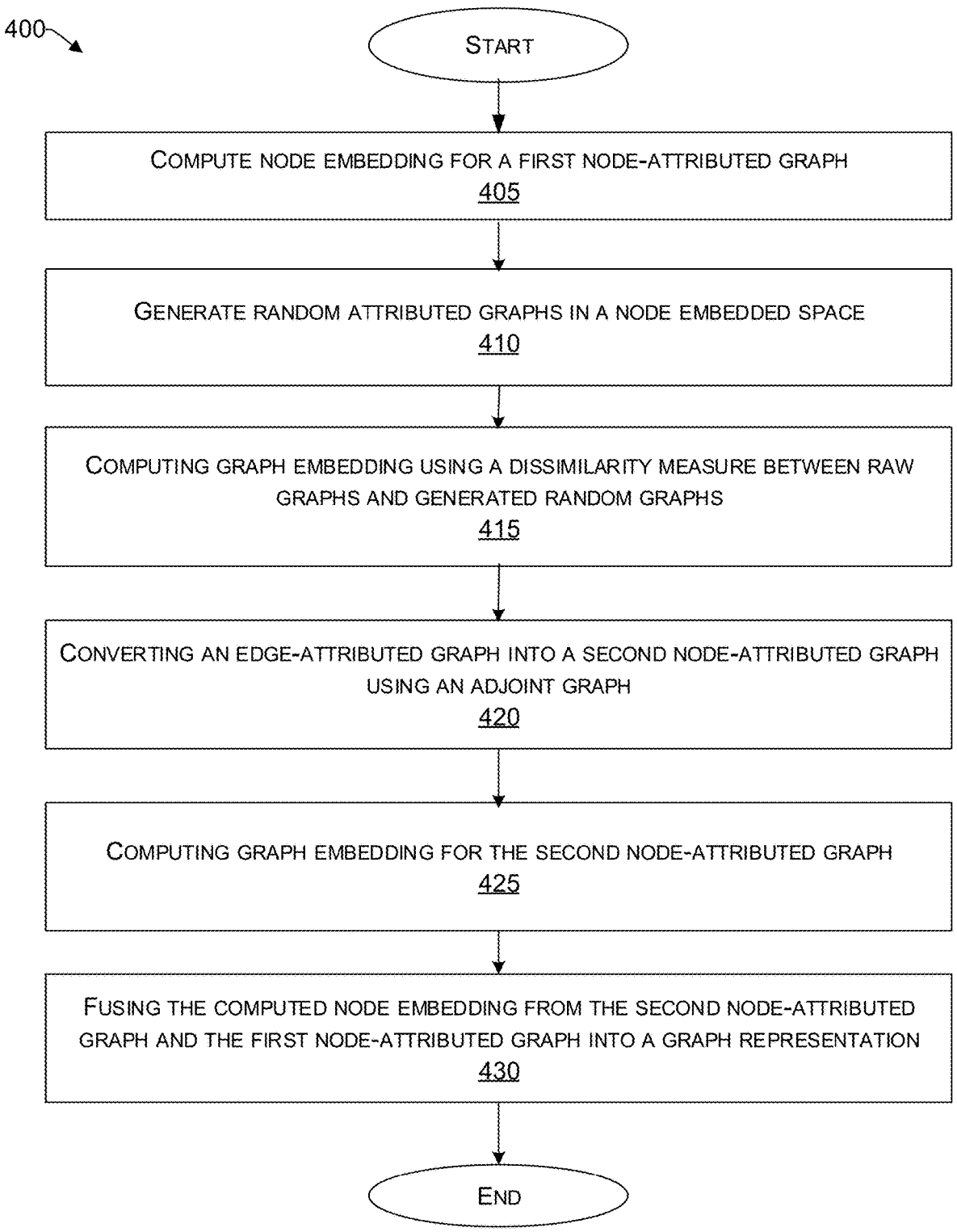
FIG. 4 is a flowchart of a computer-implemented method for performing graph analytics, consistent with an illustrative embodiment.

With the foregoing overview of the example architecture, it may be helpful now to consider a high-level discussion of example processes. To that end, in conjunction with FIG. 2, FIG. 4 is a flowchart 400 for a computer-implemented method for performing graph analytics by learning attributed graph embeddings from node attributes and edge attributes of a graph, consistent with an illustrative embodiment. It is to be understood that the term "raw graph" refers to an original input graph.

At operation 405, node embedding is computed for a first node-attributed graph. The first (e.g., original) node-attributed graph can have node embedding performed by any of plurality of techniques. For example, the computing node embedding can be performed by techniques including but not limited to of an eigendecomposition, a deepwalk, a node2vc, or a LINE operation, or the most recent graph kernel node embeddings Retgk, such as the return probability features (RPF).

At operation 410, there is a generating of random attributed graphs in a node embedded space. A data-dependent sample may be used, for example, wherein the generating random attributed graphs in the embedded space can include sampling a plurality of sub-graphs from the first node-attributed graph. The data-dependent strategy means that there can be a sampling of graphs from a training dataset. Rather than selecting a representative set of a whole graph, there can be a sampling of parts of graphs as random graphs. This sampling method can generate random graphs with various topological connectivities and help to identify hidden global structures. There can be a direct use of the node embeddings set sampled from a node embedding space. The following algorithm is an example of a random graph sampling procedure, consistent with an illustrative embodiment.

Input: The node embedding sets of the training graph dataset, a maximal size of the random graph Dmax.

Output: The node embeddings of a random graph Gω. The algorithm includes the following operations:

First, uniformly draw a number k in $\{1, 2, \ldots, Ntrain\}$. Second, uniformly draw a number Dk in $\{1, 2, \ldots, Dmax\}$. Third, randomly draw Dk nodes, i.e., $\{vi1, vi2, \ldots, viDk\}$ in the graph Gk. Fourth, return node embeddings $\{(R\ pim, R\ aim)\}Dkm=1$, where $\{(R\ pi, R\ ai)\}nk$, and i=1 is the node embedding set of the graph Gk of nk nodes. The node embeddings are then used in the following operations discussed herein below.

At operation 415, there is a computing graph embedding using a dissimilarity measure between original input graphs (raw graphs) and generated random graphs. The computing graph embedding for the second node-attributed graph by using a dissimilarity measure includes computing a graph feature matrix based on the special distance function by using random node-attributed graphs.

There are, for example, two distance measures that can be used to measure the distribution between a set of node embeddings in random graphs and in raw graphs. One distance measure is an energy distance ($D_E^2 = 2A-B-C$) with ground distance using concatenated node embedding vector, node label, and node attributes.

A second distance measure that can be used is energy distance ($D_E^2 = 2A-B-C$) with a ground distance using a rank-one tensor including a node embedding vector, node label, and node attributes.

At operation 420, the converting of an edge-attributed graph into a second node-attributed graph using an adjoint graph can be performed as discussed with regard to FIG. 3. The converting of the edge-attributed graph into a second node-attributed graph permits the rich information of the edge attributes to be included in a graph representation.

At operation 425, the graph embedding for the second node-attributed graph (e.g., the converted edge-attributed graph) is performed. The graph embedding can be performed by performing operations 405, 410, and 415 on the second node-attributed graph.

At operation 430, there is a fusing of the computed node embedding from the second node-attributed graph and the first node-attributed graph into a graph representation. The fusing implementation is based on:

$$\vec{Z}(G) = [\vec{Z}_0^T(G), \vec{Z}_1^T(G), \vec{Z}_2^T(G)]^T \in \mathbb{R}^{3R},$$

where $\vec{Z}_0(G) = \vec{Z}^N(G)$, $\vec{Z}_1(G) = \vec{Z}^N(G) \circ \vec{Z}^E(G)$, and $\vec{Z}_2(G) = |\vec{Z}^N(G) - \vec{Z}^E(G)|$.

In the above fusing implementation, Z0(G) is the node embeddings from node attributed graph, and Z1(G) is the node embeddings from the line graph, which is converted from edge attributed graph.

Although the flowchart ends at operation 430, additional operations may be performed according to the present disclosure. For example, graph clustering, classification, and/or anomaly detection can be performed after the fusing of the computed node embedding from an edge attributed graph and node attributed graph.

FIG. 5 is table comparing test results on large datasets by performed by various methods including the present method, consistent with an illustrative embodiment. The test accuracy and runtime are provided. It can be seen that the scalable attributed graph embeddings (SAGE) according to the present disclosure is superior in both test accuracy and runtime (in seconds) across all the data sets. For example, in the proteins data. SAGE has the highest accuracy 77.2+(0.3) with a retune time of 4.6 seconds. SAGE compares favorably with RetGK, which shows an accuracy of 75.8 and a runtime of 166.6 seconds. Thus, the computer resources used are greatly reduced and higher accuracy is achieved.

Figure 6:
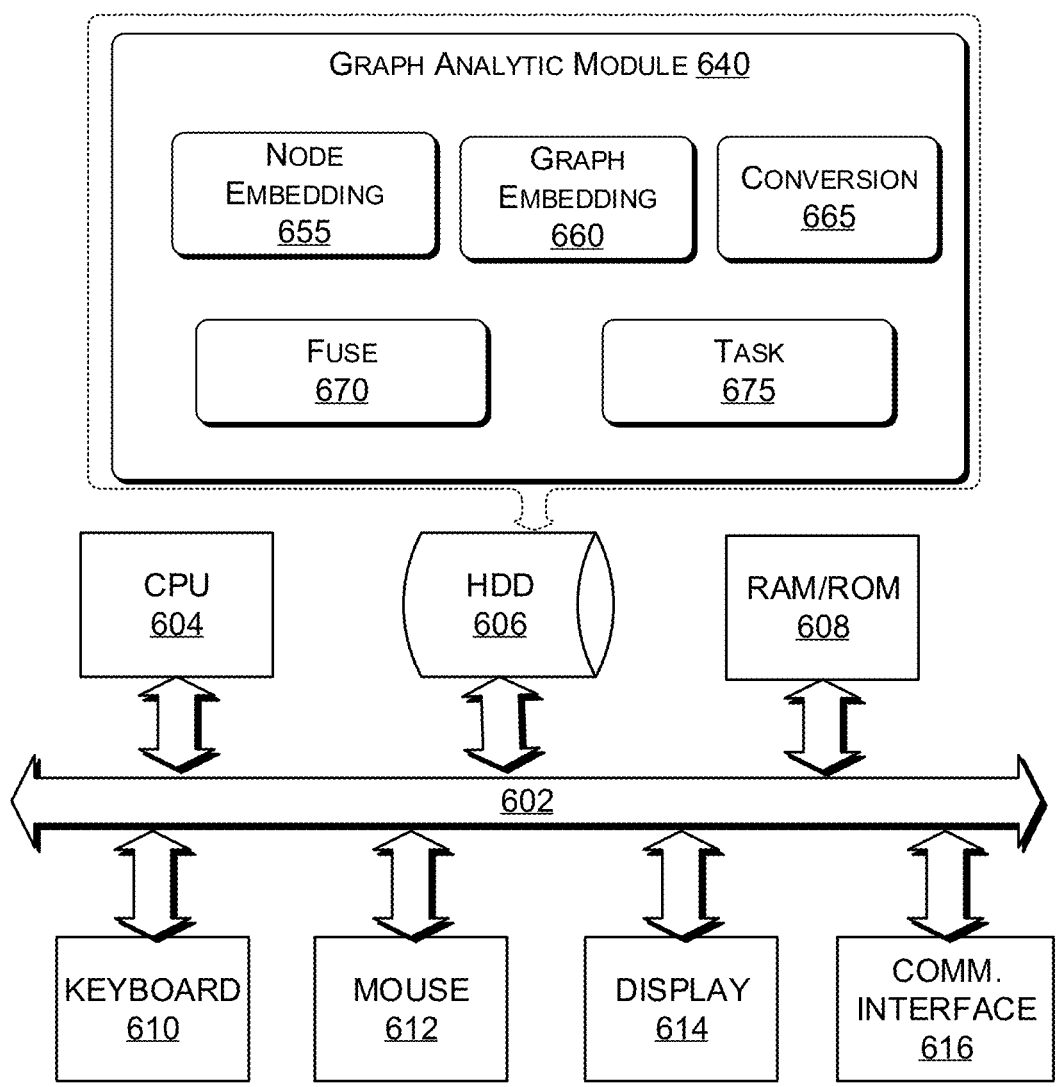
FIG. 6 is a functional block diagram illustration of a particularly configured computer hardware platform, consistent with an illustrative embodiment.

FIG. 6 provides a functional block diagram illustration of a computer hardware platform that is capable of communicating with a system as discussed herein. In particular, FIG. 6 illustrates a particularly configured network or host computer platform 600, as may be used to implement the method for leveraging simple model predictions for enhancing performance shown in FIG. 4.

The computer platform 600 may include a central processing unit (CPU) 604, a hard disk drive (HDD) 606, random access memory (RAM) and/or read-only memory (ROM) 608, a keyboard 610, a mouse 612, a display 614, and a communication interface 616, which are connected to a system bus 602. The HDD 606 can include data stores.

In one embodiment, the HDD 606, has capabilities that include storing a program that can execute various processes, such as a graph analytic module 640 for executing a method for performing graph analysis by learning attributed graph embeddings from node attributes and edge attributes of a graph, in a manner described herein. There can be various modules configured to perform different functions that can vary in quantity. For example, there are node embedding 655, graph embedding 660, and conversion 665, fuse 670, and task 675 modules that provide instructions to perform the operations of the computer-implemented method.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

Example Cloud Platform

Figure 7:
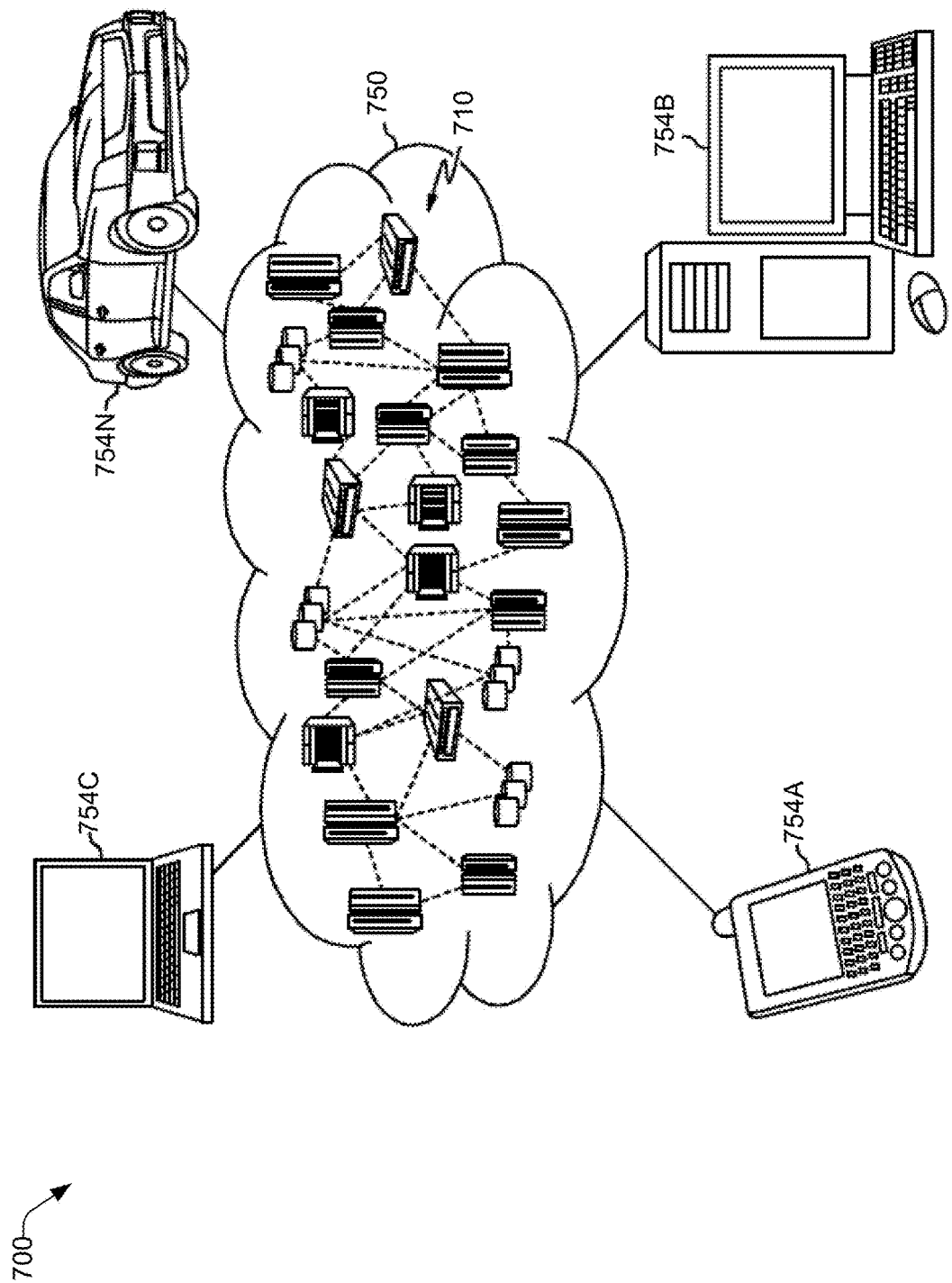
FIG. 7 depicts an illustrative cloud computing environment utilizing cloud computing.

As discussed above, functions relating to environmental and ecological optimization methods may include a cloud 750 (see FIG. 7). It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service; a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 7, an illustrative cloud computing environment 700 utilizing cloud computing is depicted. As shown, cloud computing environment 700 includes cloud 750 having one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms, and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
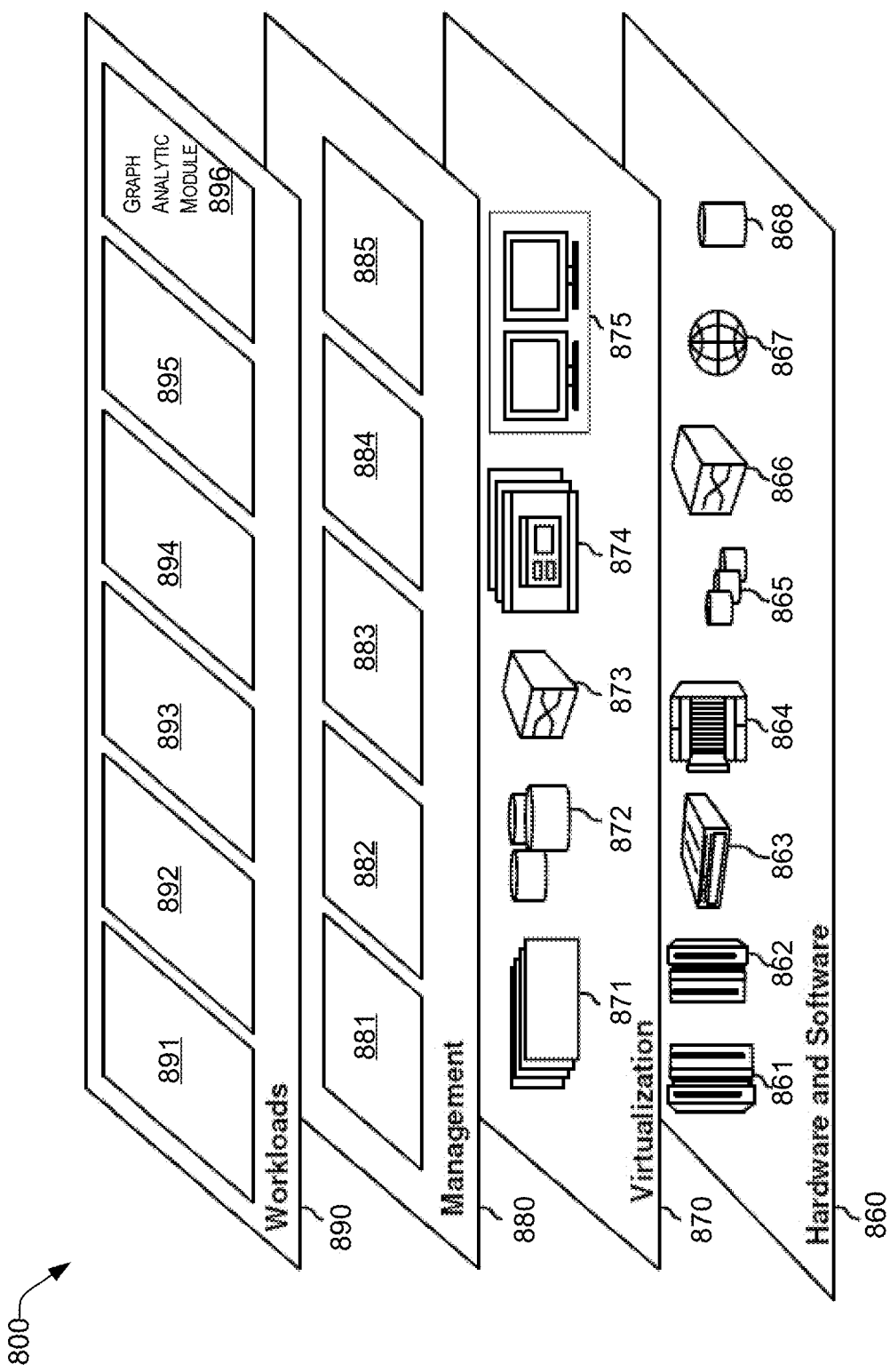
FIG. 8 depicts a set of functional abstraction layers provided by a cloud computing environment.

Referring now to FIG. 8, a set of functional abstraction layers provided by cloud computing environment 800 (FIG. 8) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 include hardware and software components. Examples of hardware components include: mainframes 861; RISC (Reduced Instruction Set Computer) architecture based servers 862: servers 863: blade servers 864: storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and a Graph Analytic module 896 to perform graph analytics by learning attributed graph embeddings from node attributes and edge attributes of a graph, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for performing graph analytics by learning attributed graph embeddings from node attributes and edge attributes of a graph, the method comprising:
computing a node embedding for a first node-attributed graph in a node embedded space;
generating one or more random attributed graphs in the node embedded space;

computing a graph embedding using a dissimilarity measure between one or more raw graphs and the one or more generated random graphs;
converting an edge-attributed graph into a second node-attributed graph using an adjoint graph;
computing the graph embedding for the second node-attributed graph obtained by the converting of the edge attributed graph;
fusing the computed node embedding from the second node-attributed graph and the first node-attributed graph into a graph representation.

2. The computer implemented method according to claim 1, further comprising applying the graph representation to a machine learning (ML) or an artificial intelligence (AI) task-dependent analysis.

3. The computer implemented method according to claim 1, wherein computing the node embedding is performed by one of an eigendecomposition, a deepwalk, a node2vc, or a LINE operation.

4. The computer implemented method according to claim 1, wherein the generating random attributed graphs in the embedded space comprises sampling a plurality of sub-graphs from the first node-attributed graph.

5. The computer implemented method according to claim 1, wherein the computing graph embedding for the second node-attributed graph by using a dissimilarity measure includes computing a graph feature matrix based on the special distance function by using random node-attributed graphs.

6. The computer implemented method according to claim 1, wherein the converting an edge-attributed graph into the second node-attributed graph using an adjoint graph further comprises casting edge-attributed graphs as embedding node attributed graphs.

7. The computer implemented method according to claim 1, wherein computing graph embedding for the second node-attributed graph includes passing a new node attributed graph.

8. The computer implemented method according to claim 1, further comprising performing one or more of graph clustering, classification, or anomaly detection.

9. A system for performing graph analytics, comprising:
a processor configured to perform graph representation by learning attributed graph embeddings of node attributes and edge attributes of a graph;
a memory coupled to the processor, the memory storing instructions to cause the processor to perform acts comprising:
compute a node embedding for a first node-attributed graph in a node embedded space;
generate one or more random attributed graphs in the node embedded space;
compute a graph embedding using a dissimilarity measure between one or more raw graphs and the one or more generated random graphs;
convert an edge-attributed graph into a second node-attributed graph using an adjoint graph;
compute the graph embedding for the second node-attributed graph obtained by the converting of the edge attributed graph; and fuse the computed node embedding from the second node-attributed graph and the first node-attributed graph into a graph representation.

10. The system according to claim 9, wherein the processor is further configured to compute the node embedding for the first node-attributed graph by performing one of an eigendecomposition, a deepwalk, a node2vc, or a LINE operation.

11. The system according to claim 9, wherein the processor is further configured to generate random attributed graphs in the embedded space by sampling a plurality of sub-graphs from the original node-attributed graph.

12. The system according to claim 9, wherein the processor is further configured to compute the graph embedding for the second node-attributed graph by using a dissimilarity measure that includes computing a graph feature matrix based on the special distance function by using random node-attributed graphs.

13. The system according to claim 9, wherein the processor is further configured to convert an edge-attributed graph into the second node-attributed graph using an adjoint graph by casting edge-attributed graphs as embedding node attributed graphs.

14. The system according to claim 9, wherein the processor is further configured to compute graph embedding for the second node-attributed graph.

15. A non-transitory computer-readable storage medium tangibly embodying a computer-readable program code having computer-readable instructions that, when executed, causes a computer device to perform a method of graph analytics by learning attributed graph embeddings from node attributes and edge attributes of a graph, the method comprising:
computing a node embedding for a first node-attributed graph in a node embedded space;
generating one or more random attributed graphs in the node embedded space;
computing a graph embedding using a dissimilarity measure between one or more raw graphs and the generated random graphs;
converting an edge-attributed graph into a second node-attributed graph using an adjoint graph;
computing the graph embedding for the second node-attributed graph obtained by the converting of the edge attributed graph;
fusing the computed node embedding from the converted edge attributed graph and the first node attributed graph; and
providing the computed graph representations for a task-dependent analysis.

16. The computer-readable storage medium according to claim 15, the method further comprising computing the graph embedding for the second node-attributed graph by using a dissimilarity measure that includes computing a graph feature matrix based on the special distance function by using random node-attributed graphs.

17. The computer-readable storage medium according to claim 15, wherein the converting an edge-attributed graph into the second node-attributed graph using an adjoint graph further includes casting edge-attributed graphs as embedding node attributed graphs.

* * * * *